(No Model.)
R. MOCCIA.
TAILOR'S SQUARE.
No. 568,263.  Patented Sept. 22, 1896.
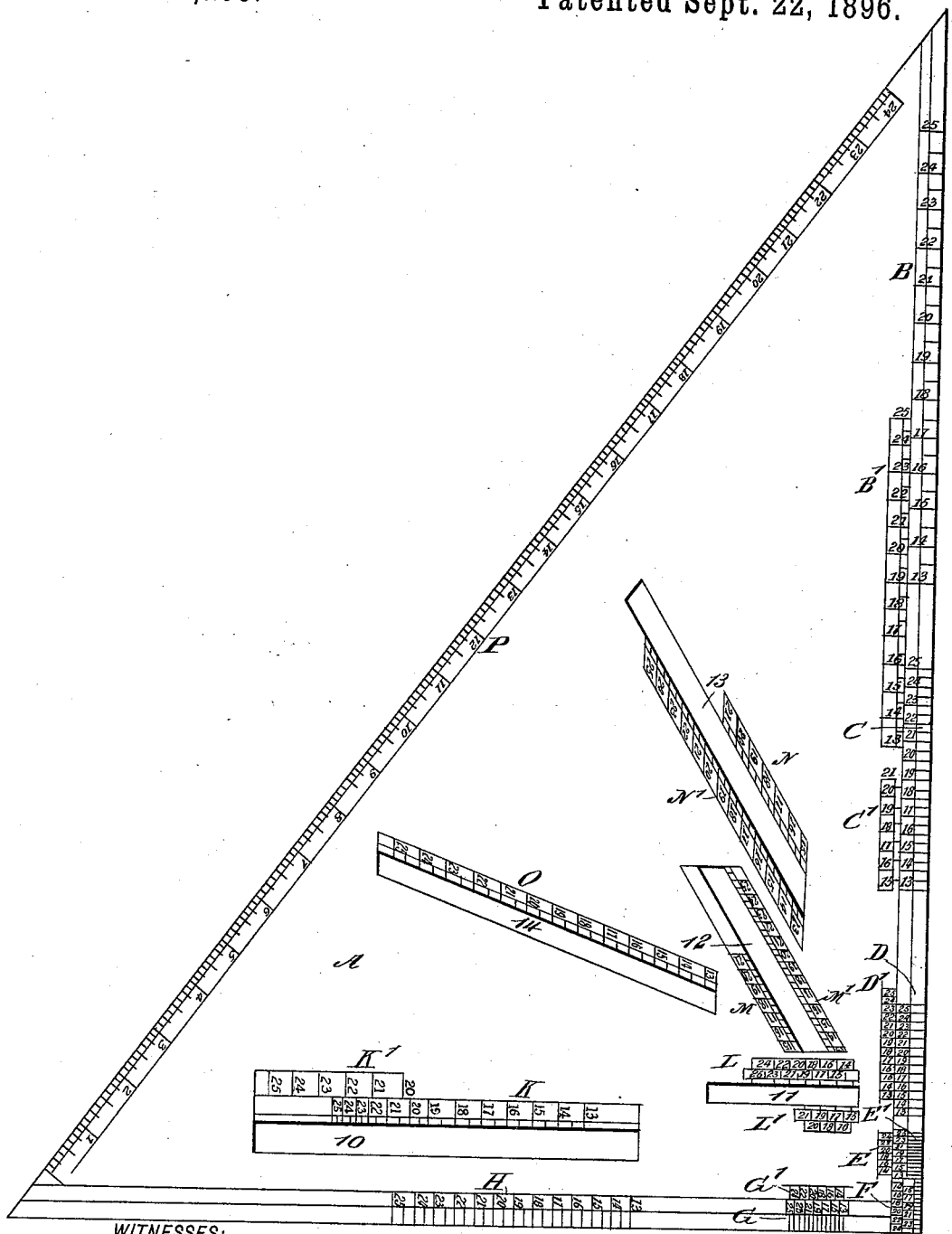
WITNESSES:
Paul Johot
Fred Ackers
INVENTOR
R. Moccia
BY
Munn
ATTORNEYS.

UNITED STATES PATENT OFFICE.

RAFFAELE MOCCIA, OF NEW YORK, N. Y.

TAILOR'S SQUARE.

SPECIFICATION forming part of Letters Patent No. 568,263, dated September 22, 1896.

Application filed January 8, 1895. Serial No. 534,182. (No model.)

*To all whom it may concern:*

Be it known that I, RAFFAELE MOCCIA, a subject of the King of Italy, at present residing at New York city, in the county and State of New York, have invented a new and Improved Tailor's Square, of which the following is a full, clear, and exact description.

My invention relates to an improvement in tailors' squares; and it has for its object to provide a square or chart in the shape of a triangle, having scales produced thereon, through the medium of which garments for men and women may be accurately cut without necessitating a knowledge of geometry on the part of the cutter.

The invention consists in the novel construction and combination of the several parts, as will be hereinafter fully set forth, and pointed out in the claims.

Reference is to be had to the accompanying drawing, forming a part of this specification, which represents a plan view of the said square.

In carrying out the invention the square A, which may also be termed a "chart," since it may be made of a stiff material such as wood or pasteboard, or of a pliable material, is of triangular shape in general contour. Upon the longer straight limb of the square or chart a series of scales is produced.

The upper scale B, which reads from "13" to "25" inches, is adapted for the measurement so the half-breast of a coat, while the adjoining fcale B' is adapted for the measurement of the half of the breast of a vest. This latter scale likewise reads from "13" to "25" inches. The next lower scale, reading from the apex of the triangle and designated as C, is a double scale, reading from "13" to "25," through which is obtained the upper point of the shoulder of the coat and the vest, while adjacent to this double scale a second double scale C' is printed or produced, whereby the same point may be obtained in measuring for ladies' wraps or garments. This scale reads from "13" to "21" inches.

Below the scales C and C' two other sets of scales D and D' are printed, the outer scale being used to obtain the upper collar seam of the back of men's body garments, while the inner scale D' is for finding the side bodies of ladies' garments.

The next two lower scales E and E' are for obtaining the measurements of the hollow of the back in sack and frock forms of coats, while the last scale F on the said straight line is used to obtain the width of the armhole in sack and over coats.

The shorter scales G and G' are respectively intended for obtaining the length of the front of the coat and vest, while the longer scale H at the base is used to obtain the width of the back when measuring for sack coats.

An opening 10 is made in the chart or square parallel with the base and near thereto, and at one margin of this opening two scales K and K' are printed, the longer scale K being used to obtain the measurement from the shoulder to the center of the sleeve-opening of the coat and the smaller scale to obtain the measurement from the front waist to the seat of pants.

A second opening 11 is made horizontally in the body of the square or chart near the longer straight-edge, and this opening has a scale L at one side and a shorter scale L' at the opposite side. The scale L is used for ascertaining the depth of shoulder in men's garments, while the scale L' is used for obtaining the depth of shoulder in women's garments.

A diagonal opening 12 is made in the body of the chart or square above the opening 11, and at the margins of this opening 12 two scales M and M' are made, the longer scale M' being used in ascertaining the depth of armhole of the side bodies of men's garments and the shorter scale M for ascertaining the depth of armhole in the side bodies of women's garments.

A fourth opening 13 is made above the opening 12, substantially parallel therewith, containing at one side a short scale N and a large scale N' at the opposite side. The longer scale N' is used to ascertain the width of the back at the shoulder and the dip of shoulder in men's garments, while the scale N is similarly used for women's garments.

A fifth opening 14 is made in the body of the square or chart, between the lower opening 10 and the upper opening 13, and at an angle to both. A double scale O is located at one side of this opening and is intended to be used for ascertaining the width of armhole in the coat and vest. The usual scale P of feet and inches is produced along the inclined edge of the chart or square, and usually this scale indicates twenty-four inches, or two feet.

Having thus described my invention, I claim as new, and desire to secure by Letters Patent—

1. A chart or square of triangular form, being provided in its longer straight-edge with the scales B, B', C, C', D, D', E, E', and F, the chart or square being likewise provided at its base portion with scales G, G' and H, and said chart or square being further provided with series of openings 10, 11, 12, 13 and 14 produced in its body, the openings 10 and 11 being parallel with the base, and the openings 12, 13 and 14 at different angles to the base, the openings 12 and 13 being parallel each opening having a scale produced at its margin, as and for the purpose specified.

2. A tailor's square, comprising a triangular square having a plurality of scales along two of its edges and a single scale along its third edge and provided with the opening 10 parallel with the base, the opening 11 adjacent to the longer straight-edge of the square and parallel with the base, the said opening 11 being shorter than the opening 10 and in a different horizontal plane, the diagonal opening 12 above the opening 11, the opening 13 above the opening 12 and parallel therewith, and the opening 14 above the opening 10 and at one side of the opening 12 and at an angle thereto, each opening having a scale at its margin, substantially as described.

RAFFAELE MOCCIA.

Witnesses:
J. FRED ACKER,
VI FEBBO.